(12) United States Patent
Ito

(10) Patent No.: US 6,999,094 B1
(45) Date of Patent: Feb. 14, 2006

(54) GAME DEVICE, GAME PROCESSING METHOD AND INFORMATION RECORDING MEDIUM

(75) Inventor: Masaaki Ito, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 292 days.

(21) Appl. No.: 09/660,187

(22) Filed: Sep. 12, 2000

(30) Foreign Application Priority Data

Sep. 16, 1999 (JP) ................................. 11-262807

(51) Int. Cl.
*G09G 5/00* (2006.01)
(52) U.S. Cl. ........................... 345/582; 463/6; 463/31; 463/32; 463/33; 463/34; 345/473; 345/474
(58) Field of Classification Search ........ 345/473–474, 345/582; 463/6, 31–34, 3
See application file for complete search history.

(56) References Cited

U.S. PATENT DOCUMENTS

| | | | | |
|---|---|---|---|---|
| 5,263,136 A | * | 11/1993 | DeAguiar et al. .......... | 345/538 |
| 5,755,620 A | * | 5/1998 | Yamamoto et al. ........... | 463/34 |
| 6,030,292 A | * | 2/2000 | Hirano et al. ................. | 463/43 |
| 6,074,300 A | * | 6/2000 | Hirano et al. ................. | 463/43 |
| 6,117,008 A | * | 9/2000 | Machiguchi ................... | 463/6 |
| 6,134,602 A | * | 10/2000 | Engstrom et al. ........... | 709/328 |
| 6,141,025 A | * | 10/2000 | Oka et al. .................... | 345/531 |
| 6,157,384 A | * | 12/2000 | Oka et al. .................... | 345/848 |
| 6,217,445 B1 | * | 4/2001 | Inoue ............................. | 463/6 |
| 6,237,095 B1 | * | 5/2001 | Curry et al. ................. | 713/178 |
| 6,409,597 B1 | * | 6/2002 | Mizumoto .................... | 463/31 |
| 6,417,854 B1 | * | 7/2002 | Isowaki et al. ............. | 345/473 |
| 6,496,189 B1 | * | 12/2002 | Yaron et al. ................ | 345/428 |

* cited by examiner

*Primary Examiner*—Michael Razavi
*Assistant Examiner*—Jin-Cheng Wang
(74) *Attorney, Agent, or Firm*—Finnegan, Henderson, Farabow, Garrett & Dunner, L.L.P.

(57) ABSTRACT

Smooth, stable and high quality game image is provided by accurately pre-reading background data required for image processing each time. The game device therefore reads background data required for a game that displays a condition of a moving vehicle within a virtual three-dimensional space together with a background in the main memory from a CD-ROM (recording medium) prior to image processing. This device comprises a pre-reading unit for pre-reading background data from a recording medium when reading a start line (reference line) set at a distant position in a specified distance away from the limit line of the visual field direction of display is crossing a new area. A recording medium is a medium that records background data by dividing it into a plurality of areas in advance, and the pre-reading unit comprises a unit for judging on which of the areas the reference line is crossing, and a reading unit for reading in memory the background data of the area judged as being crossed with the reference line.

8 Claims, 8 Drawing Sheets

LANDFORM MAP

| AR1 | AR2 | AR3 | ---- |
|---|---|---|---|
| PRAIRIE | VILLAGE | PRAIRIE | PRAIRIE |
| VILLAGE | VILLAGE | PRAIRIE | PRAIRIE |
| VILLAGE | CITY | VILLAGE | VILLAGE |
| CITY | CITY | VILLAGE | PRAIRIE |

AR16

REQUIRED NUMBER OF MEMORY BLOCKS:
PRAIRIE : 1 BLOCK
VILLAGE : 2 BLOCKS
TOWN : 2 BLOCKS
CITY : 3 BLOCKS

FIG.8

| BLOCK No. | 1 | 2 | 3 | 4 | 5 | 6 | 7 | 8 | 9 | 10 | 11 |
|---|---|---|---|---|---|---|---|---|---|---|---|
| COUNT VALUE | 85 | 85 | 85 | 80 | 80 | 90 | 90 | 90 | 85 | 85 | 70 |
| USAGE STATUS | ○ | — | * | — | * | ○ | — | * | ○ | — | * | — | * | ○ | — | * | ○ |

| BLOCK No. | 12 | 13 | 14 | 15 | 16 | 17 | 18 | 19 | 20 | 21 | 22 |
|---|---|---|---|---|---|---|---|---|---|---|---|
| COUNT VALUE | 10 | 10 | 5 | 15 | 15 | 15 | 0 | 0 | 0 | 0 | 0 |
| USAGE STATUS | ◎ | — | * | — | ◎ | ◎ | — | * | — | * | + | + | + | + | + |

| BLOCK No. | 23 | 24 | 25 | 26 | 27 | 28 | 29 | 30 | 31 | 32 | 33 |
|---|---|---|---|---|---|---|---|---|---|---|---|
| COUNT VALUE | 0 | 0 | 0 | 0 | 0 | 0 | 0 | 0 | 0 | 0 | 0 |
| USAGE STATUS | + | + | + | + | + | + | + | + | + | + | + |

○ : PREVIOUSLY STORED　　* : CONSECUTIVE USAGE (" – " ALSO USED)
◎ : CURRENTLY IN USE　　+ : UNUSED

FIG.9

| BLOCK No. | 1 | 2 | 3 | 4 | 5 | 6 | 7 | 8 | 9 | 10 | 11 |
|---|---|---|---|---|---|---|---|---|---|---|---|
| COUNT VALUE | 85 | 85 | 85 | 80 | 80 | 5 | 5 | 5 | 5 | 0 | 70 |
| USAGE STATUS | ○ — * — * | | | ○ — * | | ◎ — * — * — * | | | | + | ○ |

| BLOCK No. | 12 | 13 | 14 | 15 | 16 | 17 | 18 | 19 | 20 | 21 | 22 |
|---|---|---|---|---|---|---|---|---|---|---|---|
| COUNT VALUE | 60 | 60 | 55 | 50 | 50 | 50 | 60 | 60 | 45 | 50 | 50 |
| USAGE STATUS | ○ — * — ○ | | | ○ — * — * | | | ○ — * | | ○ | ○ — * | |

| BLOCK No. | 23 | 24 | 25 | 26 | 27 | 28 | 29 | 30 | 31 | 32 | 33 |
|---|---|---|---|---|---|---|---|---|---|---|---|
| COUNT VALUE | 40 | 40 | 40 | 40 | 30 | 30 | 30 | 20 | 20 | 10 | 10 |
| USAGE STATUS | ○ — * — * — * | | | | ○ — * — * | | | ○ — * | | ○ — * | |

○ : PREVIOUSLY STORED　　* : CONSECUTIVE USAGE (" – " ALSO USED)
◎ : CURRENTLY IN USE　　+ : UNUSED

GAME DEVICE, GAME PROCESSING METHOD AND INFORMATION RECORDING MEDIUM

BACKGROUND OF THE INVENTION

1. Field of the Invention

The present invention generally relates to a video game device, and particularly relates to a game device capable of expressing more realistic images in game devices installed at an amusement center or home and an image processing device used in such game device.

2. Description of the Related Art

Pursuant to the development of computer technology, video game devices using computer graphics technology have come into general use. Video game devices of this kind are widely accepted by the users. A number of game devices of various kinds has been devised, and a variety of game software corresponding to such devices is being supplied.

In order for users to further enjoy video games, it is desirable that images with more realistic expressions are displayed on a screen. In vehicle races such as a car race, for example, it is desirable that the movement of vehicles or background is expressed naturally.

As one of the elements to express this natural movement, a data reading control may be proposed in which data of a vast game space is read from a recording medium such as a CD-ROM into the memory inside the game device and thereafter displayed.

Although the same game space, in the case of a game space for games in which characters move slowly as in an RPG (Role Playing Game) or a movement of a character to another location is made in an instant, the data may be read upon temporarily suspending the image processing. Accordingly, such data reading control is very easy.

However, in case of games in which consecutive movement of characters gives a great deal of influence to the nature of the game, as in a car race game, etc., background data required to be read together with the movement of the vehicle amount to a huge volume. Accordingly, such data reading control becomes very complicated. For example, if data reading is executed upon temporarily suspending image processing as in the case of RPG, the game will stop and would not be effective in a car race game. Reading into a memory all of the background data of the vast game space from a CD-ROM, etc. is practically impossible from the perspective of memory space and time required for reading.

Accordingly, in case of games which express scenes with characters moving at high speed as in conventional car race games, image processing was executed by dividing background data along travelling route per area, and pre-reading background data for required areas.

However, a game compatible with this pre-reading method is, for example, a car race game in which a vehicle as a moving object runs a predetermined course (travelling route). A method for this case was simple, in which background data of the following area was to be memorized in the available memory space upon the vehicle passing a certain point on the course. Some recent car race games or car games enable a player to drive the vehicles in any direction within the game space. In this kind of game, the travelling directions of a vehicle, which include a plurality of branching running route or areas such as a prairie that is not a part of the original running route, are subject to the player's operation. In other words, it becomes very difficult for the device to simply figure out the running route block on which the car may run in the near future and pre-read background data based on the current speed or location of the vehicle.

Accordingly, the object of the present invention is to provide smooth, stable and high quality game images by accurately pre-reading background data required for image processing each time, with a simple method, in games in which a player can move an object such as a vehicle to arbitrary directions within the game space.

SUMMARY OF THE INVENTION

In order to achieve the aforementioned object, the present invention is a game device which makes a work memory read from the storage means, prior to image processing, background data required in games for displaying a moving object within a virtual three-dimensional space together with the background, comprising:

pre-reading means for pre-reading the background data from the storage means using a reference line set at a distant position in a specified distance away from the limit line of the visual field direction of display.

In another embodiment of the present invention, the storage means stores the background data by previously dividing it into a plurality of areas in advance; and the pre-reading means comprises a judging means for judging on which of the areas the reference line is crossing, and reading means for storing in the work memory the background data of the area judged as being crossed with the reference line by this judging means.

In another embodiment of the present invention, the plurality of areas are respectively stored in the storage means by dividing the content of background data per type and approximately the same size, and the work memory comprises a plurality of memory blocks set at the same memory capacity, and wherein the reading means is for storing background data of the respective areas in the memory blocks of more than "n" blocks (positive integral number) in accordance with the amount of its data.

In still another embodiment, the reading means includes means for judging whether the work memory block is a vacant space or not, and means for successively storing background data per the area in more than "n" memory blocks when the work memory block is recognized as a vacant space by this judgment.

In another embodiment, this game device comprises counting means for detecting whether the moving object exists within the respective areas equivalent to the memory blocks storing background data of the work memory, or whether an area exists within the visual field, and counting the moving object or area periodically, wherein the reading means includes means for determining the memory block to store the background data based on the count value corresponding to each of the memory blocks by the counter means when it is judged that there is no vacant space in the memory block.

In still another embodiment, the reading means includes determining means for determining a plurality of consecutive memory blocks when background data to be stored requires a plurality of memory blocks.

In another embodiment, the determining means is for determining the plurality of consecutive memory blocks representing the highest or lowest value by comparing the count values of the plurality of consecutive memory blocks.

Furthermore, in another embodiment of the present invention, the determining means is for determining the plurality of consecutive memory blocks representing the highest or lowest value by operating the average values of the count values for the plurality of consecutive memory blocks. In still another embodiment of this invention, the moving object is a vehicle that moves within the virtual three-dimensional space.

Another invention to achieve the aforementioned object is a data processing method of a game device which makes a work memory read from the storage means, prior to image processing, background data required in games for displaying a moving object within a virtual three-dimensional space together with the background, comprising:

pre-reading means for pre-reading the background data from the recording medium using a reference line set at a distant position in a specified distance away from the limit line of the visual field direction of display.

Moreover, this invention is also on information recording medium having recorded thereon background data and a program for executing the respective means.

BRIEF DESCRIPTION OF THE DRAWINGS

FIG. 8 is a diagram explaining an example of storing data in the memory block pursuant to pre-reading; and FIG. 9 is a diagram explaining another example of storing data in the memory to memory block pursuant to pre-reading.

PREFERRED EMBODIMENTS

The game device pertaining to the embodiments of the present invention is now explained with reference to FIGS. 1 through 9.

The game device in this embodiment is a car race game for moving a vehicle as an object within a virtual three-dimensional space (game space). Particularly, provided is a car game that enables a car to run in arbitrary directions when it is difficult to specify the travelling route to be selected since the route has many branching routes for reaching a destination, or in places such as prairies or villages where travelling routes are not clearly prescribed.

Figure 1:
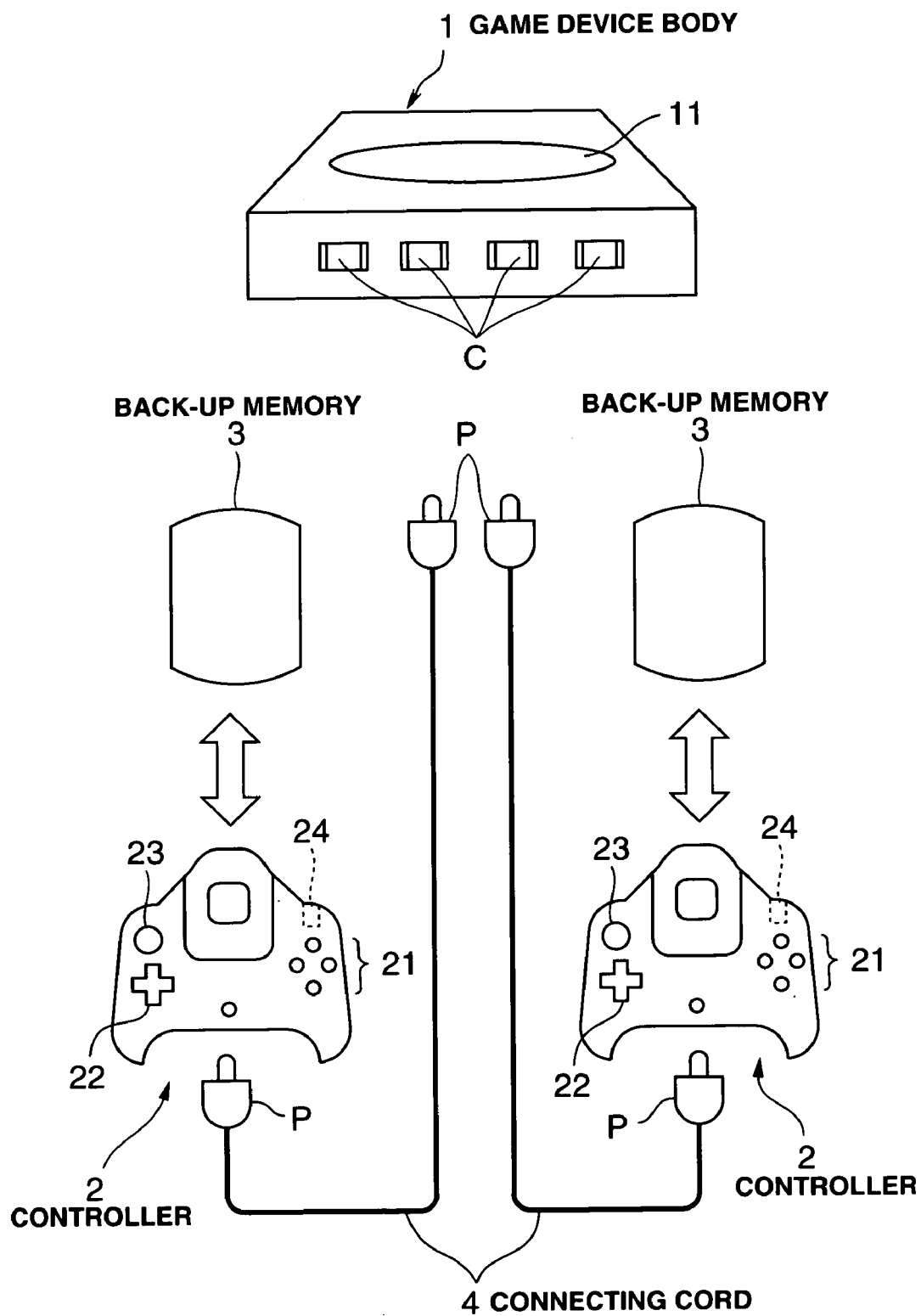
FIG. 1 is a perspective diagram showing the outline of the entire game device pertaining to an embodiment of the present invention.
Figure 2:
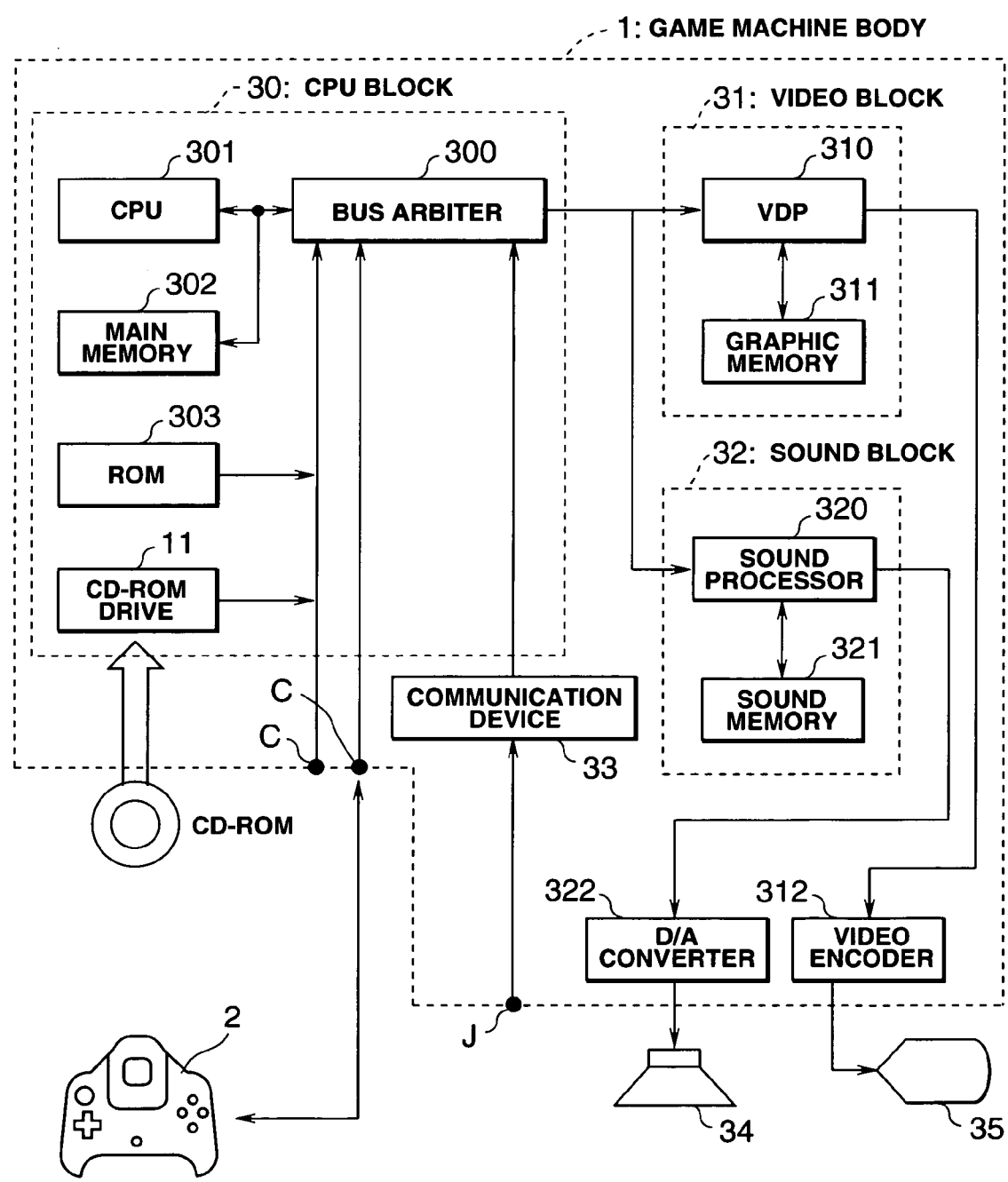
FIG. 2 is a block diagram showing the schematic electrical structure of this game device.

This game device is now explained. FIG. 1 is a diagram showing the outline of the game device pertaining to this embodiment, and FIG. 2 is its electrical hardware block diagram.

As shown in FIG. 1, this game device is structured by mutually connecting a game device body 1, controllers 2 and sub units 3.

The game device body 1 is a control device body for controlling the game progress. The game device body 1 can be connected to a plurality of controllers 2 via connectors C. Furthermore, the game device body 1 comprises a CD-ROM drive 11, and a removable recording medium (storage means) such as a CD-ROM may be installed therein.

The controllers 2 comprise a structure as an operational unit for a player to operate, and includes operational buttons 21, cross keys 22, analog direction keys 23 and R trigger switches 24, and can be connected to a game device body 1 via a connecting cord 4 equipped with a connector P. These operational units comprise a steering wheel, accelerator, brake, gear shift, etc. required to move a vehicle as an object within a virtual three-dimensional space. A player properly operates those operational units while viewing the monitor screen during a game. With this, its operational information is conveyed to the CPU inside the game device body 1 described later, and enables a player to run a vehicle in arbitrary directions within the game space under the control of the CPU.

The controllers 2 also comprise backup memory 3, which is removable.

The game device body 1 comprises a structure similar to a computer device, and as shown in FIG. 2, comprises a CPU block 30, video block 31, sound block 32 and communication device 33, etc.

The CPU block 30 comprises a bus arbiter 300, CPU 301, main memory 302, ROM 303 and CD-ROM drive 11. The bus arbiter 300 is structured to be able to control the transmission/reception of data by allocating bus occupying time to mutually connected devices via bus. The CPU 301 is structured to be able to access the back up memory 3 via the main memory 302, ROM 303, CD-ROM drive 11, video block 31 and sound block 32, and controllers 2.

The CPU 301 conducts various processing and controlling required for performing the game, forwards image data to the graphic memory 311, and can forward voice data to the sound memory 321. The ROM 303 is a storage area for an initial program loader. The ROM 303 is an element structuring the recording medium, and programs required for processing the CPU 301 are pre-recorded. As for a recording medium, for example, a CD-ROM may be used.

The CD-ROM drive 11 uses a CD-ROM as a recording medium for data provided externally. The main game program, various required data and background data (texture data or polygon data) are stored in this CD-ROM, and those data are read into the main memory 302 when necessary. Other various recording media may be used instead of this CD-ROM. Programs and background data may be forwarded to the main memory via the communication device 33. This setting allows transmission of data from a fixed disk of a server placed at a remote location.

The Video block 31 comprises a VDP (Video Display Processor) 310, graphic memory 311 and video encoder 312. Through these structures, the video block 31 conducts generation of polygon image data (a vehicle as an object), drawing of background image (mapping of texture data), composition of polygon image data as a background image, clipping processing, etc. The video encoder 312 is structured to enable the conversion of image data generated by the VDP 310 into specified TV signals such as NTSC or PAL, and output to the main monitor 35 (cathode-ray tube of a TV receiver, etc.) to be connected externally.

The sound block 32 comprises a sound processor 320, sound memory 321 and D/A converter 322. Through these structures, the sound block 32 is structured to conduct voice synthesis based on wavy pattern data, and to enable the output of sound signals. The D/A converter 322 is structured to enable the conversion of voice data formed by the sound processor 320 into analogue signals, and output to speaker 34 (speaker of TV receiver or speaker of sound device) to be connected externally.

The communication device 33 is, for example, a modem or terminal adapter, structured to enable the access of this game device body 1, and to function as an adapter connecting this game device body 1 with an external circuit. The communication device 33 receives data transmitted from a server for game supply including an internet server to be connected to a public circuit net, and is able to supply such data to the bus of the CPU block 30. A public circuit net may be a subscription line, dedicated line, wire/wireless, etc.

The operation of this embodiment is now explained focusing on reading background data into the main memory 302 from the CD-ROM. This reading is executed in a pre-reading method pertaining to this invention under the control of the CPU 301.

Firstly, the relationship between a landform map as background data to be set to execute this pre-reading and a memory block with the same memory capacity respectively to be allocated to a fixed area in the main memory 302 is explained.

Figure 3:
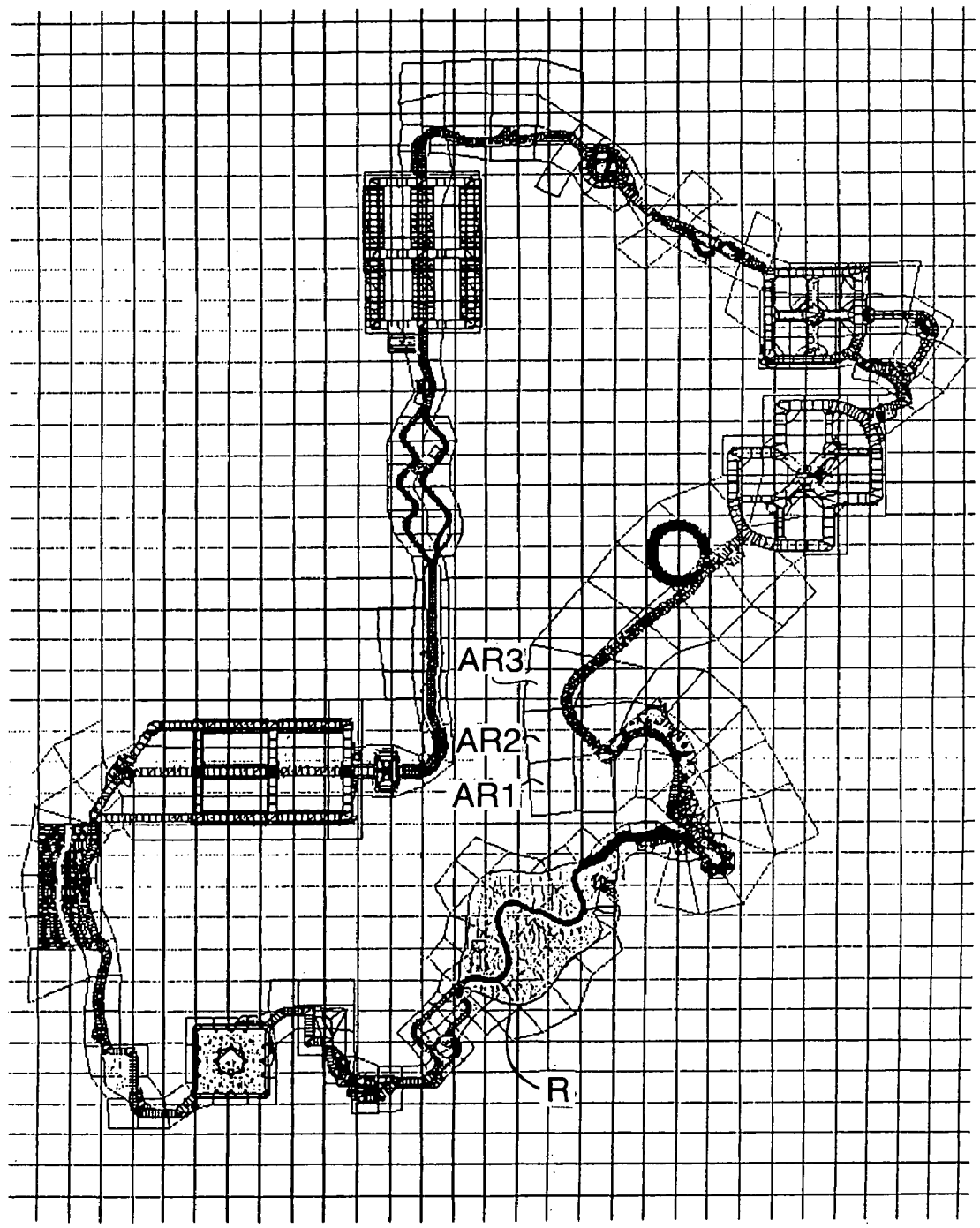
FIG. 3 is a diagram showing an example of the landform (background) to be created in the game space divided into areas.
Figure 4:
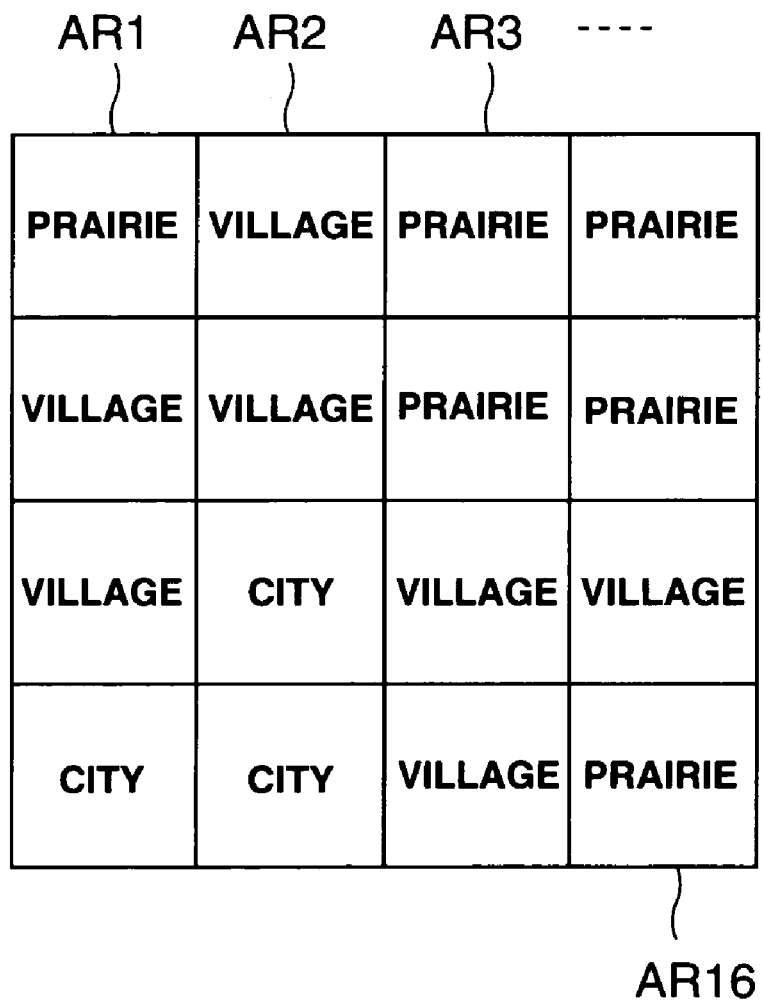
FIG. 4 is a typical diagram showing an example of the landform map divided into area.

Landform map described in a virtual three-dimensional space available for use in a car-race game of this game device is now shown in FIG. 3. The figure shows a xz face of the world coordinate system, and the bold black line on this map represents the main running route R. This running route R comprises a large number of branch routes compared to the one for a car race game that circulates around an ordinary fixed route. Also, the running route R runs within many kinds and number of fields such as a city, village and prairie, and furthermore, allows to run in arbitrary directions within the field deviating from running the route R.

A plurality of areas per field type and approximately the same size are now assumed by dividing the landform map including the running route. With this, areas (AR 1, AR 2, AR 3 . . . . . .) defined with the thin lines are created. Out of the plurality of areas, as an example, 16 adjacent areas (AR, AR2 . . . . . . AR16) are represented as in FIG. 4 as the landform map (background data). For example, area AR1 is to be determined as a prairie field, and area AR2 is to be determined as a village field, etc. Considering the difference of data volume (amount of background data) due to objects, etc. arranged in correspondence with the field type are different, the number of blocks required for the memory area upon writing in the main memory is to be determined as follows: one block from memory when an area is prairie, two blocks from memory when an area is village or town and three blocks from memory when an area is city.

Figure 5:
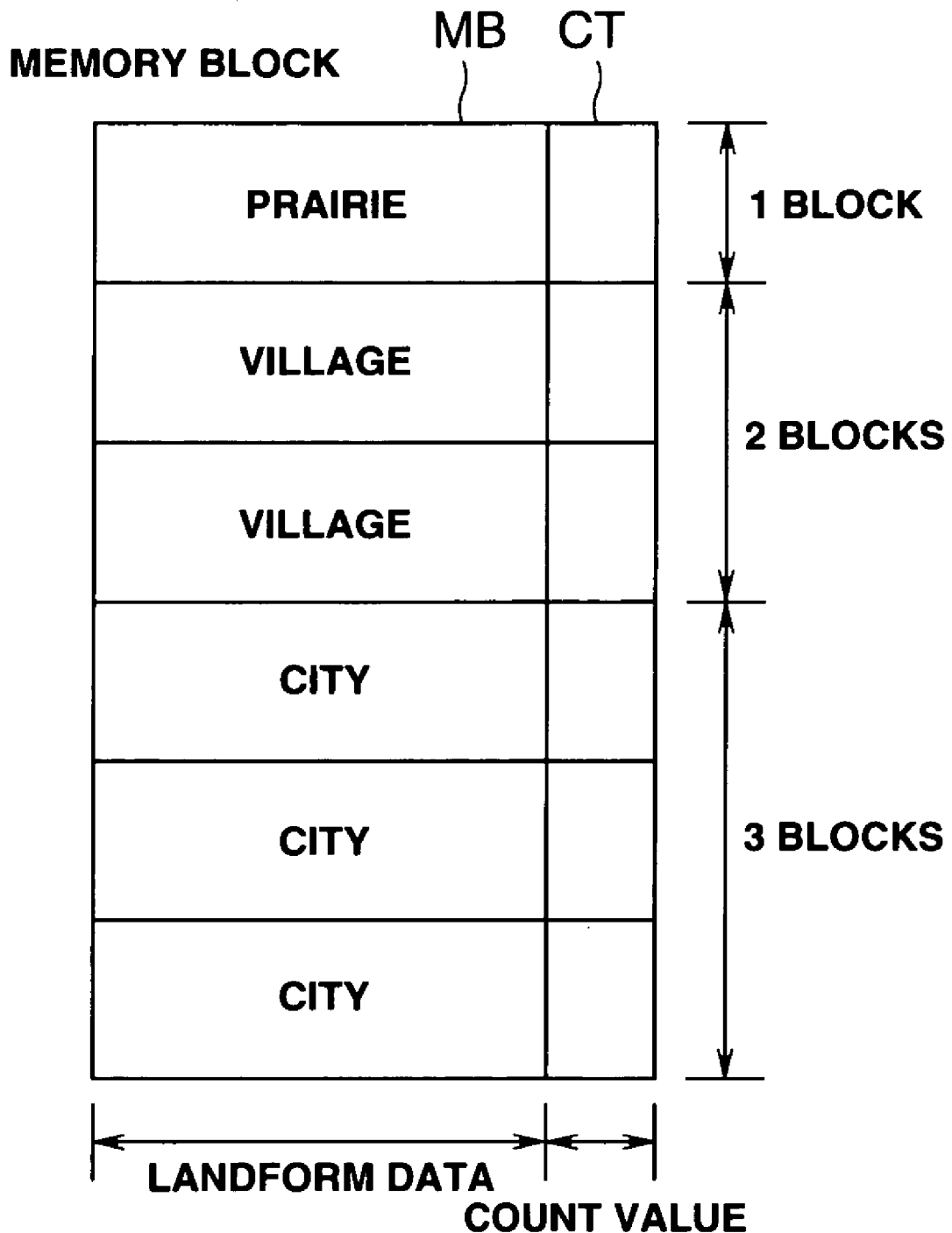
FIG. 5 is a diagram typically explaining a part of the memory block to be set in the main memory as a work memory.

An example of this data writing is shown in FIG. 5. From the top of the figure, one block is used to store landform data for the prairie area, two consecutive blocks are used to store landform data for the village area and three consecutive blocks are used to store landform data for the city area. Each block MB has the same storage capacity. For those block MB, the count value areas of a software counter CT to be processed by the CPU 301 are set respectively, and its count value is written in. This counter CT periodically judges whether a vehicle exists in a respective area AR equivalent to each block MB within the main memory or not, or background area-exists within the camera sight or not, and, upon respective judgments, increments the count value of the counter CT for the block MB that stores landform data of that area where no vehicle exists or no vehicle exists within the visual field. Thus, the area AR with less number of vehicles running has a larger count value of the counter CT for the corresponding block MB. Accordingly, confirming this count value shows the frequency of the vehicle running within its corresponding area AR. Even if there are a plurality of block MBs which correspond to an area AR, the count value is the same among those blocks.

Figure 6:
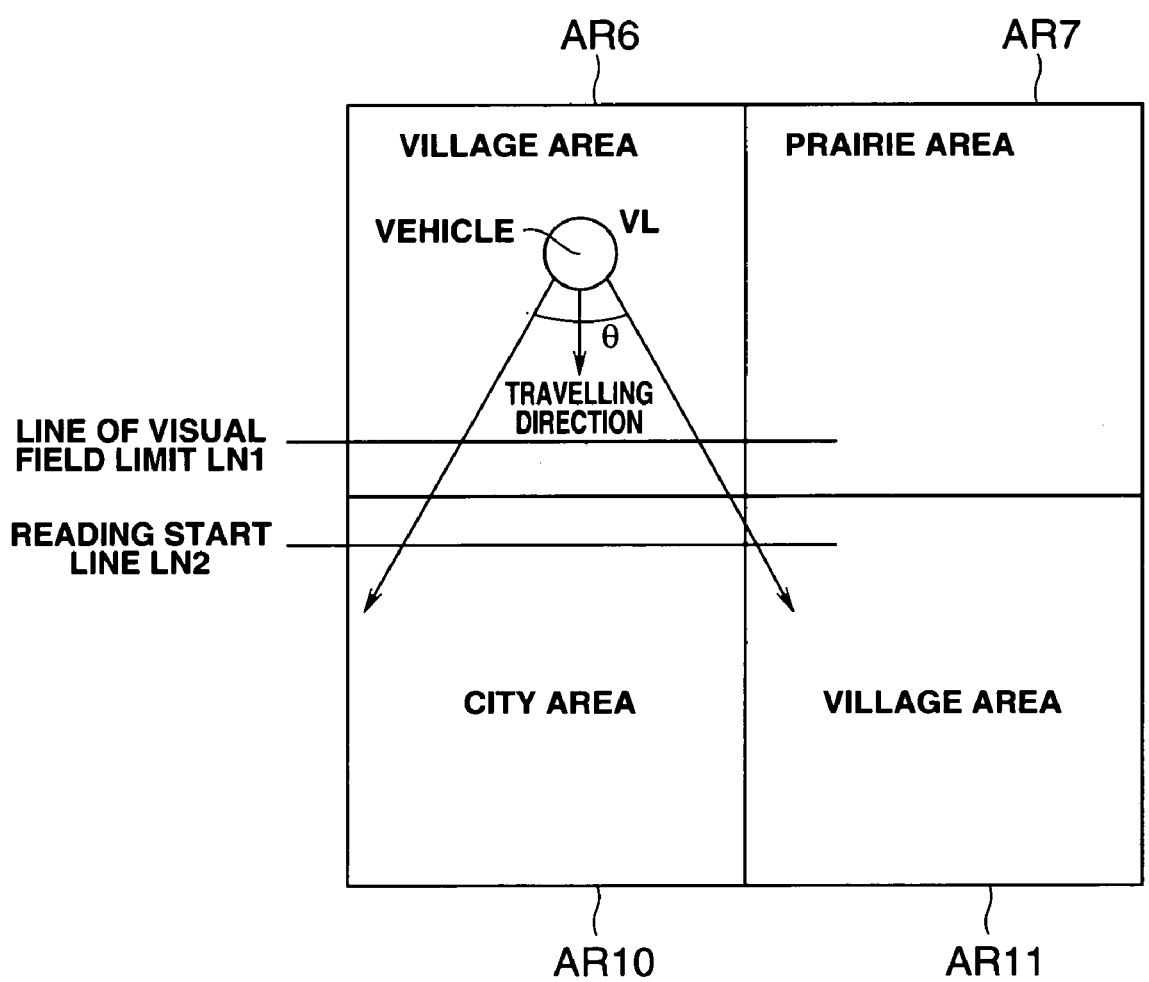
FIG. 6 is a diagram explaining the positional relationship of the reading start line (reference line) and area regarding pre-reading.

Against the landform data thus divided, the area for pre-reading has to be found, and method thereof is shown in FIG. 6. It is now assumed that a vehicle VL is running in a village area of area AR 6. For this vehicle VL, along with the travelling direction, a field of view with a specified angle of visibility $\theta$ is set. In a specified distance away from the visual field, a limit line of the visual field LN1, which is to be a clipping point upon display, is set. Furthermore, within this visual field, in a specified distance away from the limit line of the visual field LN1, a reading start line LN2, which is a part of pre-reading function of this invention, is set.

This reading start line LN2 is a detector which foregoes to determine an area to start pre-reading landform data. The adopted method is that, when each area is expressed with its circumcircle, this line LN2 specifies in which circumcircle (area) line LN2 within the sight is to be crossed (or entered), and to determine the area with the specified circumcircle as a targeted pre-reading area. In case of FIG. 6, it may be judged that current the pre-reading areas are both AR 10 and AR 11 since the reading start line LN2 is crossed in both circumcircles of city area AR 10 and its adjacent village area AR 11.

Figure 7:
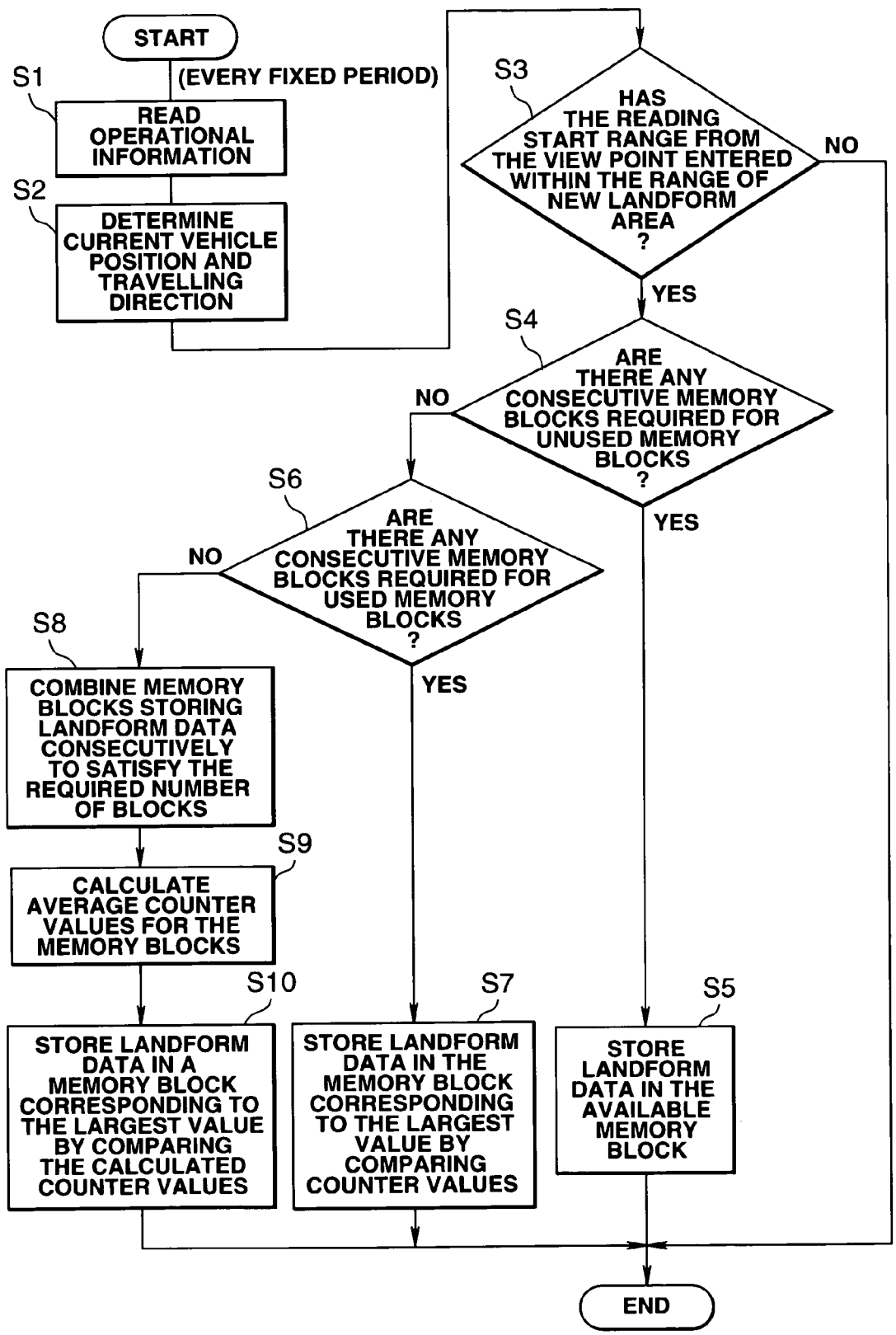
FIG. 7 is a flowchart showing the outline of the pre-reading control processing executed by the CPU.

Based on this pre-reading method, an example of reading processing for landform data (background data) to be executed with the CPU 301 is now explained according to FIG. 7. This processing is executed, for example, with a timer interruption method for each fixed time.

The CPU 301, at first, reads operational information by a player (step S1), and specifies the current location of the vehicle and the proceeding direction on the xz face of the world coordinate system (step S2).

Next, upon looking at a visual field along with the travelling direction from the current location of the vehicle (viewpoint), the CPU 301 judges whether reading the start range, i.e. reading start line LN2, enters into any new area AR (yet to read background data) in a method using the circumcircle of area as stated above (step S3). When this judgment is "no," processing will be returned to the main routine since the reading start line LN2 has not crossed a new area AR yet.

On the other hand, when the judgment is "yes" at step S3; i.e. reading start line LN2 crosses one or more new area ARs, the CPU 301 judges whether there are any required number of consecutive memory block MBs unused in the main memory 302 (step S4). However, in case the number of required memory blocks to store background data is one, "required number of consecutive memory block" means one memory block. When a judgment at this step S4 is "yes," background data (landform data) is to be read from a new area AR, and written in the vacant memory block.

On the other hand, when the judgment is "no" at step S, i.e. there are no required number of consecutive memory blocks unused, the CPU 301 judges whether, in case of a city, for example, there are required number of memory blocks which stores background data consecutively for one city area in used memory blocks MB, . . . . . . . . . (step S6). When this judgment is "yes," background data for a new area AR is to be stored in the memory block which represents the largest value (step S7) by comparing the count values corresponding to the memory block MB. It can be assumed that a large count value suggests that the frequency of usage for the background data of the memory block was low in the past, and will be the same in the future as well. According, background data of such memory block takes priority to be renewed.

On the other hand, when the judgment is "no" at step S6, search is made for memory blocks that store background data consecutively over areas with a plurality of types, and more than one set of required number of blocks is assured by combining them (step S8). Next, for each set of the consecutive memory blocks, the average count value of the respective memory blocks is computed (step S9). Furthermore, the CPU 301 compares computed count values, judges a set of memory blocks with the largest count value, and stores in the memory background data of the new area AR for the respective memory blocks of the set (step S10). The reason for searching a set of memory blocks with the largest count value is the same as the above.

The examples of the above stated pre-reading processing are shown in FIG. 8 and FIG. 9 as a typical diagram. In those diagrams, single circles indicate the blocks storing background data (landform data) read in the past, and double circles indicate blocks storing background data for areas with a vehicle, or blocks storing background data for areas within the sight of the area. "*" indicates that the block stores background data of one area consecutively (connecting with "–"). Furthermore, "+" indicates unused blocks.

The example in FIG. 8 indicates the process of storing background data of a new area AR by using an unused (vacant) memory block MB in the main memory 302 (see step S3–S5 in FIG. 7). It is assumed that the vehicles have already moved into the new area.

The example of FIG. 9 indicates a renewing process of the memory block MB with background data stored in the past by new background data. In other words, this indicates that, after detecting a new area and renewing the past consecutive background data with the new background data, vehicles have already moved into this new area. Especially, the example of FIG. 9 explains the condition that requires four consecutive memory blocks as places to secure the background data of the new area. Accordingly, the average count value was operated through the processing of steps S3, S4, S6 and S8 through S10 in FIG. 7, and memory block Nos. 6 through 9 were selected. In this case, an adjacent memory block No. 10 is handled as a vacant block. In this example, background data read later (for example, background data of block Nos. 6 through 10) is deleted earlier than those read previously (for example, background data of block Nos. 1 through 5). This is because the running course of vehicle is not linear, but, in many cases, so-called "meandering" or "zigzag" running, in which vehicles directly enter into the area read in the past from another course.

Pre-reading of background data (landform data) together with operational information enables the CPU 301 to control and instruct image processing of a car race game. In this pre-reading processing, the pre-reading start line is set in the further specified distance ahead of sight limiting line, and the vehicle proceeding area is accurately detected so that sure and stable area detection, i.e. pre-reading can be conducted, which is different from conducting pre-reading unreasonably. Accordingly, it is neither necessary to particularly increase the storage capacity of the main memory in the device, nor to read background data by stopping the image processing. Thus, on the screen displayed on the monitor 35 by image processing using this background data, displayed is an image of a vehicle running which is stable having high quality without any missing image, etc.

In the above stated embodiments, it was explained that the pre-reading start line for pre-reading detection is linear. However, this may be a circular arc form against the view point. A judgment whether this pre-reading start line crosses a new area or not may be made by comparing the square area itself and the location of the pre-reading start line, not by setting the area's circumcircle.

Furthermore, regarding the handling of count values of the counter which displays the usage frequency of background data in the memory block, contrary to the above, it may be possible to decrement a count value from the specified value after detecting that no vehicle exists in the corresponding area for each fixed time. It may be also possible to set the range of count value within a specified range in the main memory relating to each block MB, not within the block MB.

According to the game that allows a player to move an object such as a vehicle in arbitrary directions within the game space pertaining to the present invention as stated above, though a relatively easy method, it is possible to provide a smooth, stable and high quality game image by accurately pre-reading background data required for image processing each time.

We claim:

1. A game device that reads from a storage means, prior to image processing, background data required in games for displaying a moving object within a virtual three-dimensional space together with a background, comprising:

pre-reading means for pre-reading said background data from said storage means by establishing an area for pre-reading which includes: setting a predetermined angle-of-visibility based on a direction of the moving object, setting a limit-line of a visual field at a predetermined distance towards a front of the visual field, and setting a pre-reading start line at a predetermined distance beyond a front of the limit-line of the visual field that moves in the direction of the moving object when viewed from the moving object, wherein said storage means stores said background data by dividing said background data into a plurality of areas in advance;

said pre-reading means comprising judging means for judging which of said areas said pre-reading start line is crossing to determine a specific area from among the plurality of areas, and reading means for reading the background data of the area judged as being crossed with said pre-reading start line by the judging means, wherein said plurality of areas are respectively stored in said storage means by dividing the content of background data per type;

said game device further comprising a work memory including a plurality of memory blocks each set at a same memory capacity, wherein said reading means includes means for storing the background data of the crossed area in an integral number "n" of said memory blocks in said work memory in accordance with the amount of the background data to be stored, and wherein said reading means includes means for judging whether one or more of said memory blocks of said work memory are a vacant space or not, and means for successively storing the background data of said crossed area in said integral number "n" of said memory blocks when said integral number of said memory blocks are judged as vacant space and of sufficient capacity to store the background data;

said game device further comprising counting means for detecting whether said moving object exists within said areas corresponding to memory blocks storing background data, or an area that exists within the visual field, in said work memory, and counting said moving object or visual field area periodically, wherein said reading means includes means for determining the memory block to store said background data based on a count value determined for each of said memory blocks by said counting means when it is judged that there is no vacant space in said work memory.

2. A game device according to claim 1, wherein said reading means includes determining means for determining a plurality of consecutive memory blocks when background data to be stored requires a plurality of memory blocks.

3. A game device according to claim 1, wherein said determining means is for determining a plurality of consecutive memory blocks representing a highest or lowest value by comparing said count values of said plurality of consecutive memory blocks.

4. A game device according to claim 1, wherein said determining means is for determining a plurality of consecutive memory blocks representing a highest or lowest value by computing average values for said plurality of consecutive memory blocks.

5. A game device according to claim 1, wherein said moving object is a vehicle that moves within said virtual three-dimensional space.

6. A game device according to claim 1, wherein said background data is landform data prepared to enable a vehicle to travel in arbitrary directions on land represented by the background data.

7. An information recording medium having recorded therein said background data and programs for executing the respective means according to claim 1.

8. A data processing method for a game device comprising:

reading background data required for a game that displays a moving object within virtual three-dimensional space together with a background in working memory from memorizing means prior to image processing, wherein said background data is pre-read from a recording medium by establishing an area for pre-reading which includes: setting a predetermined angle-of-visibility based on a direction of the moving object, setting a limit-line of a visual field at a predetermined distance towards a front of the visual field, and setting a pre-reading start line at a predetermined distance beyond a front of the limit-line of the visual field that moves in the direction of the moving object when viewed from the moving object;

said recording medium storing said background data by dividing said background data into a plurality of areas in advance, said plurality of areas being respectively stored in said recording medium by dividing the content of background data per type and approximately the same size;

judging which of said areas said pre-reading start line is crossing to determine a specific area from among the plurality of areas, and reading the background data of the area judged as being crossed with said pre-reading start line;

storing background data of the crossed area in an integral number "n" of memory blocks in said working memory in accordance with an amount of the background data to be stored, said working memory including a plurality of memory blocks each set at a same memory capacity;

judging whether one or more memory blocks of said working memory are a vacant space or not, and successively storing the background data of said crossed area in said integral number "n" of said memory blocks judged as vacant space and of sufficient capacity to store the background data;

detecting whether said moving object exists within any of said plurality of areas corresponding to memory blocks storing background data, or an area that exists within the visual field, in said working memory, and counting said moving object or area periodically; and determining the memory block to store said read background data based on a count value determined for each of said memory blocks by said counting when it is judged that there is no vacant space in said working memory.

* * * * *